Sept. 25, 1923.

T. C. ROBERTS

CONTROL MECHANISM

Filed May 5, 1921

INVENTOR
*Theodore C. Roberts*
BY
*Ray B. Whitman*
ATTORNEY

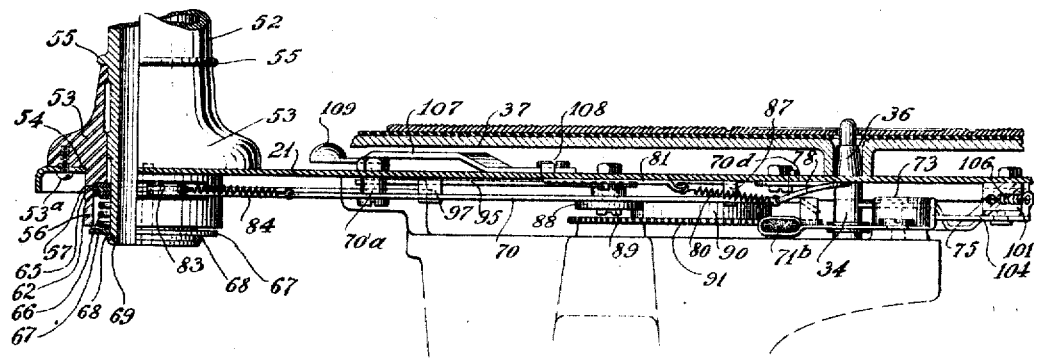
Fig. 5
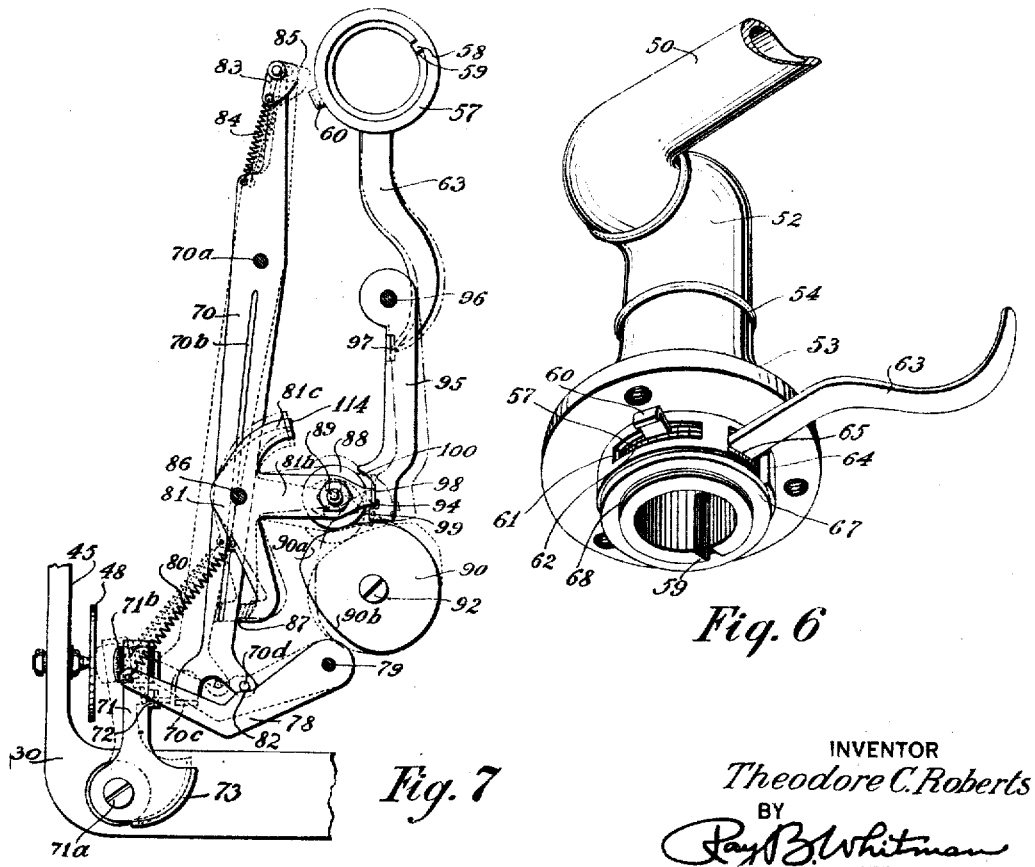
Fig. 7
Fig. 6
INVENTOR
*Theodore C. Roberts*
BY
*Ray B. Whitman*
ATTORNEY Sept. 25, 1923.  1,468,675

T. C. ROBERTS
CONTROL MECHANISM
Filed May 5, 1921   7 Sheets-Sheet 6

INVENTOR
*Theodore C. Roberts*
BY
*Ray B. Whitman*
ATTORNEY

Sept. 25, 1923. 1,468,675
T. C. ROBERTS
CONTROL MECHANISM
Filed May 5, 1921 7 Sheets-Sheet 7
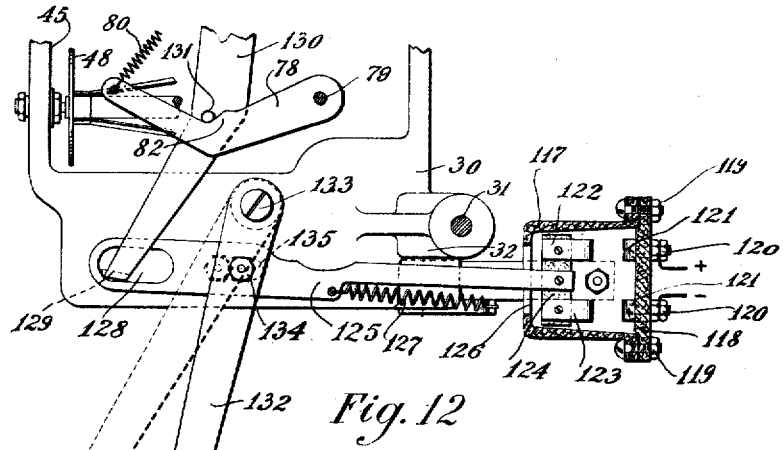
Fig. 12
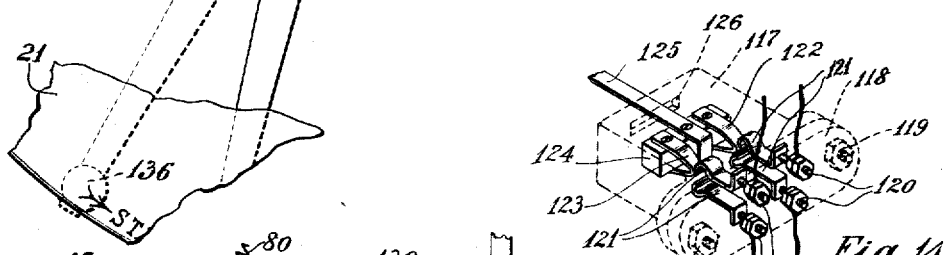
Fig. 14
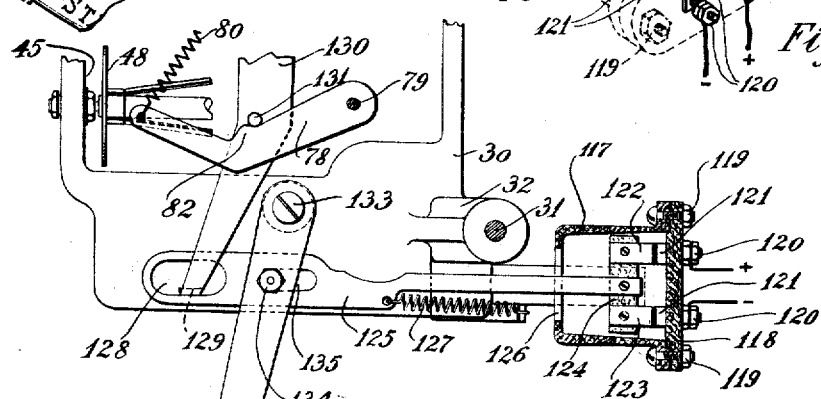
Fig. 13
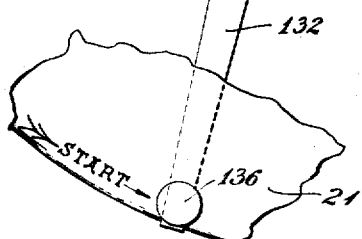
INVENTOR
*Theodore C. Roberts*
BY
*Ray B Whitman*
ATTORNEY Patented Sept. 25, 1923.

1,468,675

UNITED STATES PATENT OFFICE.

THEODORE C. ROBERTS, OF NEW YORK, N. Y., ASSIGNOR TO COLUMBIA GRAPHOPHONE MANUFACTURING COMPANY, OF BRIDGEPORT, CONNECTICUT, A CORPORATION OF DELAWARE.

CONTROL MECHANISM.

Application filed May 5, 1921. Serial No. 467,114.

*To all whom it may concern:*

Be it known that I, THEODORE C. ROBERTS, a citizen of the United States, and a resident of New York city, county and State of New York, have invented certain new and useful Improvements in Control Mechanism, of which the following, taken in connection with the accompanying drawings, is a specification.

This invention relates to improvements in control mechanism, and more particularly to a means for automatically starting the motor of a phonograph by the movement of the tone-arm, and for automatically stopping it after the record has been played. This latter, or stopping feature, is of the type of true "non-set-stop," in which the stop functions automatically—and without prior setting—after the stylus, or needle, reaches the last groove of the record, and irrespective of the length of the record.

Other features consist in the provision of means for rendering the stop inoperative, and means for stopping the machine manually and independently of the automatic mechanism, and arranged so that neither interferes with the other, regardless of whether or not such mechanism has previously been rendered inoperative.

There is also provided a novel type of motor-plate particularly designed so that all parts of the control mechanism may be permanently and accurately positioned and aligned. In the embodiment of the invention here shown, the motor-plate is provided with all of the necessary non-set-stop parts assembled to it so that the entire motor becomes one unit, and in which all of the parts will be permanently assembled in proper relation during manufacture, and which in use can be handled and adjusted as a single unit. The plate with the non-set-stop parts thus assembled thereon, and with the motor removed, lends itself to convenient and compact storing and shipping, the connections of the parts being such that they will not readily become deranged.

While the principal purpose of the invention is to provide a machine which will function perfectly—starting immediately upon placing the parts in starting position and stopping automatically and positively at the end of the reproduction, consideration has also been given to the requirements and restrictions for manufacturing the invention in quantity. This requires a construction, simple in design, economical to manufacture and both durable and efficient in operation; and one, moreover, which is practically "fool-proof," and requires a minimum of adjustment during its life. This last is necessary, since the invention is used largely by persons not familiar with automatic mechanisms.

The invention, as disclosed, is such, that both the starting and stopping of the mechanism, at any position, may be controlled completely by the movement of the reproducer, the machine being automatically started when the operator places the reproducer, carried by its tone-arm, in position to commence playing, automatically stopped when the reproducer ceases its advance across the face of the record, remaining at rest as the reproducer is being returned to non-playing position beyond the edge of the record, and which may be automatically started when the reproducer member is moved from such position to playing position. Moreover, the stopping mechanism remains inoperative to stop the machine as the reproducer is either held stationary, or moved in either direction, within a certain area adjacent the periphery of the turn-table. This allows sufficient latitude of movement, while the reproducer is being manually engaged with the first groove of the record, so that any possibility of the machine stopping, during this placing of the reproducer upon the record, will be prevented.

With these and other objects in view, both a preferred form of this invention, and a modification thereof, are illustrated in the accompanying drawings, and these will now be described and the invention finally pointed out in claims.

In the drawings—

Figure 4:
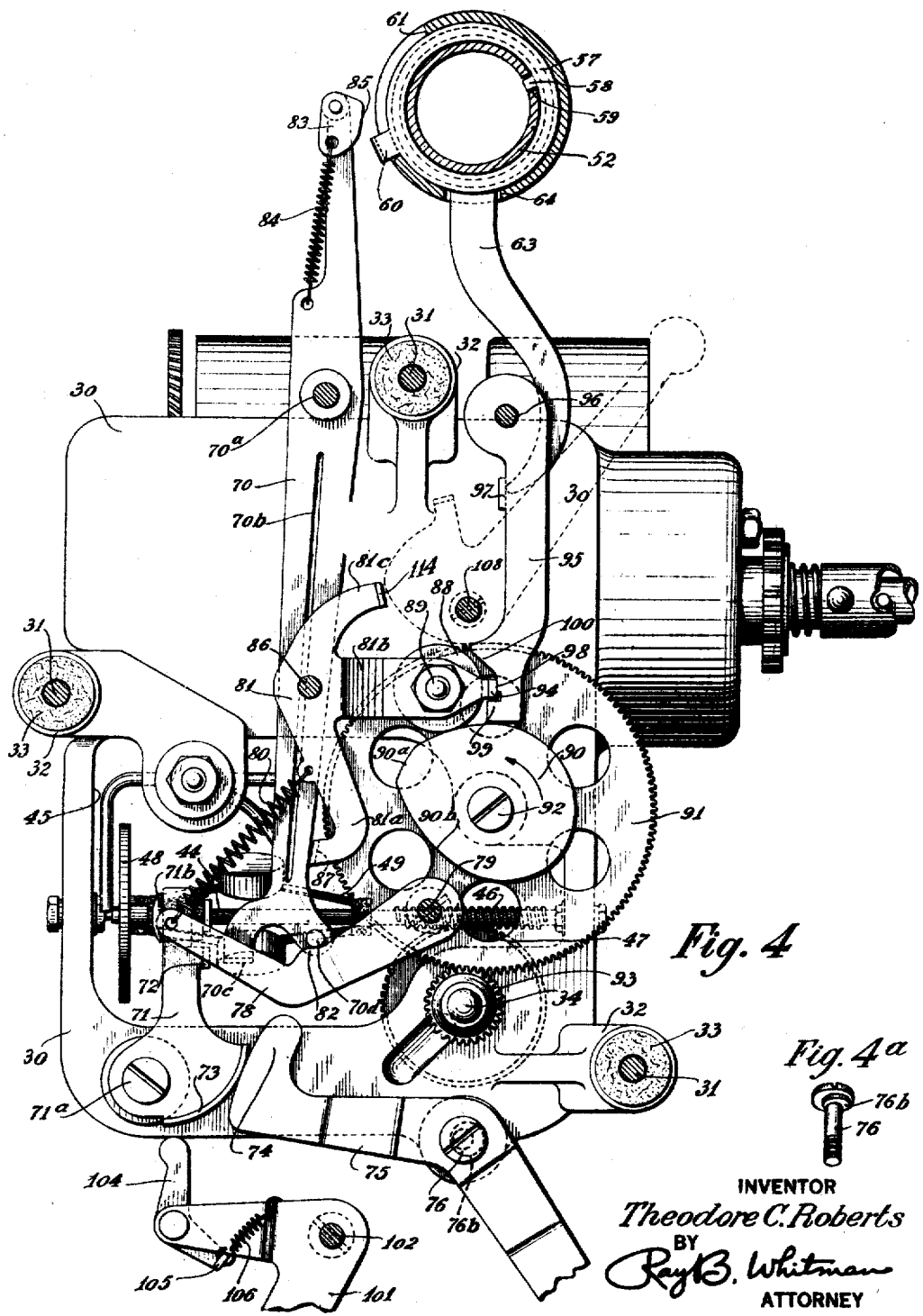
Figure 4 is a plan view of the motor and start-and-stop mechanism, the motor-plate having been removed to disclose the details of construction, the bolts attaching the motor-plate and mechanism being shown in cross-section.

Figure 4ᵃ is a detail perspective view of an eccentric adjustment screw which serves as a bearing for the speed-regulating lever.

Figure 2:
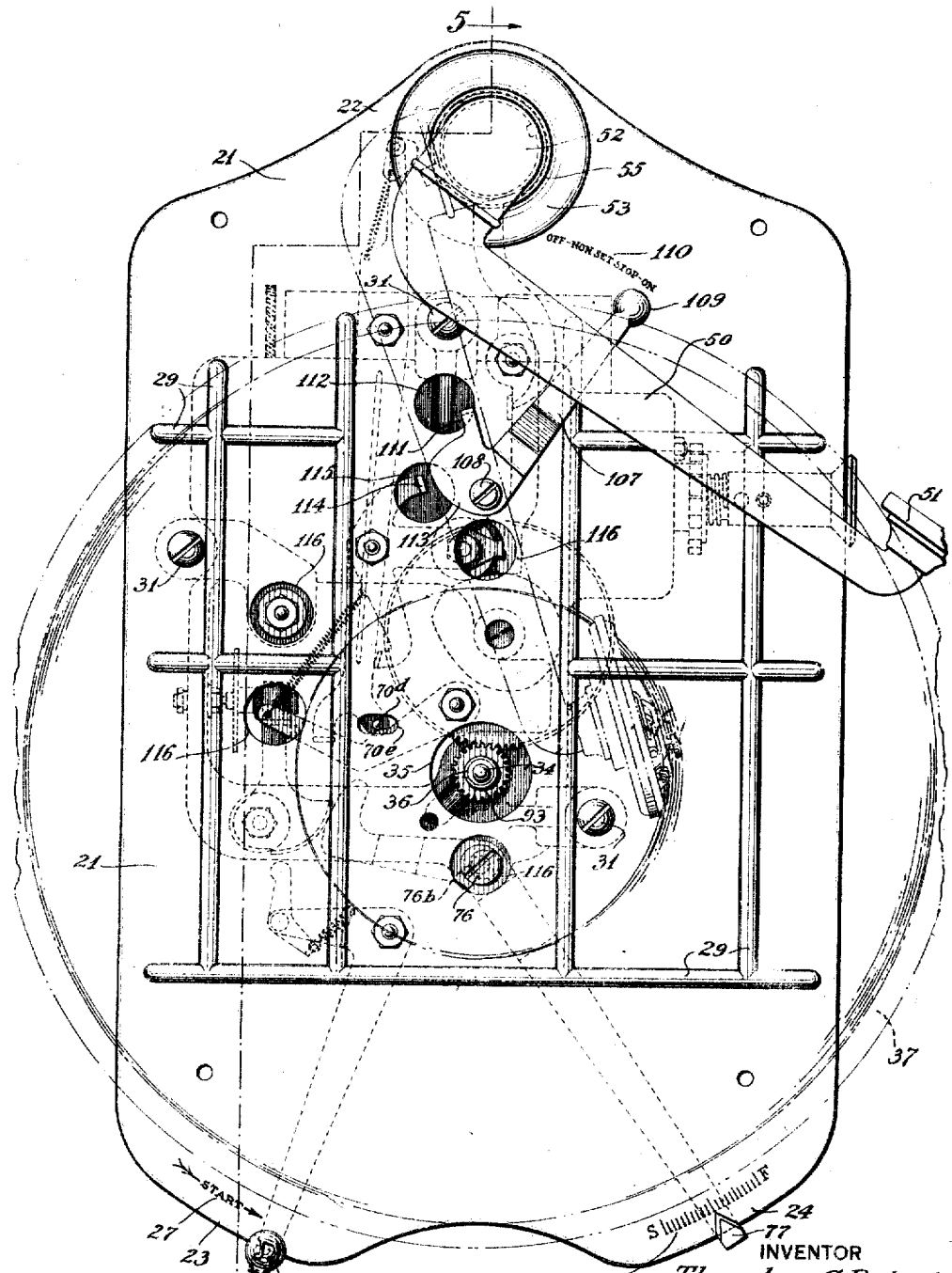
Figure 2 is a plan view from above of the motor-plate with the tone-arm, motor, and start-and-stop mechanism assembled thereto as a unit, and also outlining—by dotted lines—the position of the turn-table and a record placed thereon.

Figure 5 is a vertical sectional view taken along the line 5—5 of Figure 2.

Figure 6 is a perspective view of the tone-arm mounting, shown detached from the motor-plate.

Figure 7 is a plan view from above of the start-and-stop mechanism and showing, in dotted lines, the several operative positions thereof.

Figure 8:
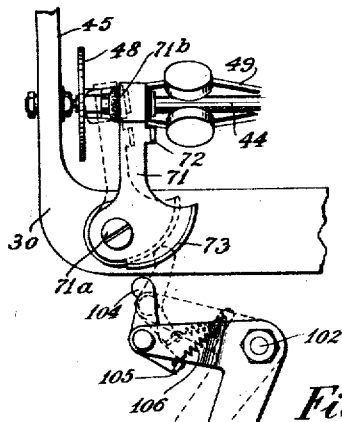

Figure 8 is a detached plan view of the manually-operated start-and-stop mechanism, showing, with the aid of dotted lines, the two operative positions thereof.

Figure 9:
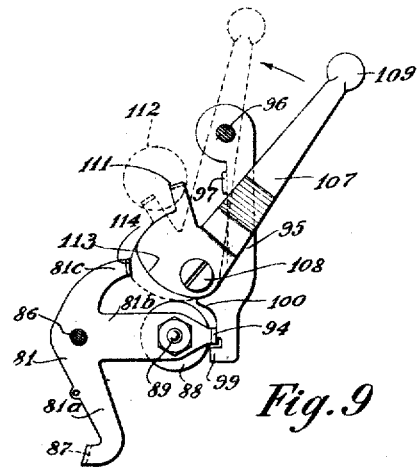

Figure 9 is a detached plan view of the automatic-stop eliminating means, similarly showing its two operative positions.

Figure 10:
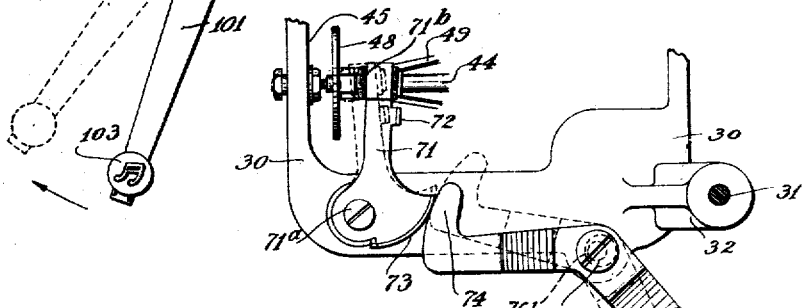

Figure 10 is a detached plan view of the speed-regulating device, the full speed position being shown in full lines, and low speed position in dotted lines.

Figure 11:
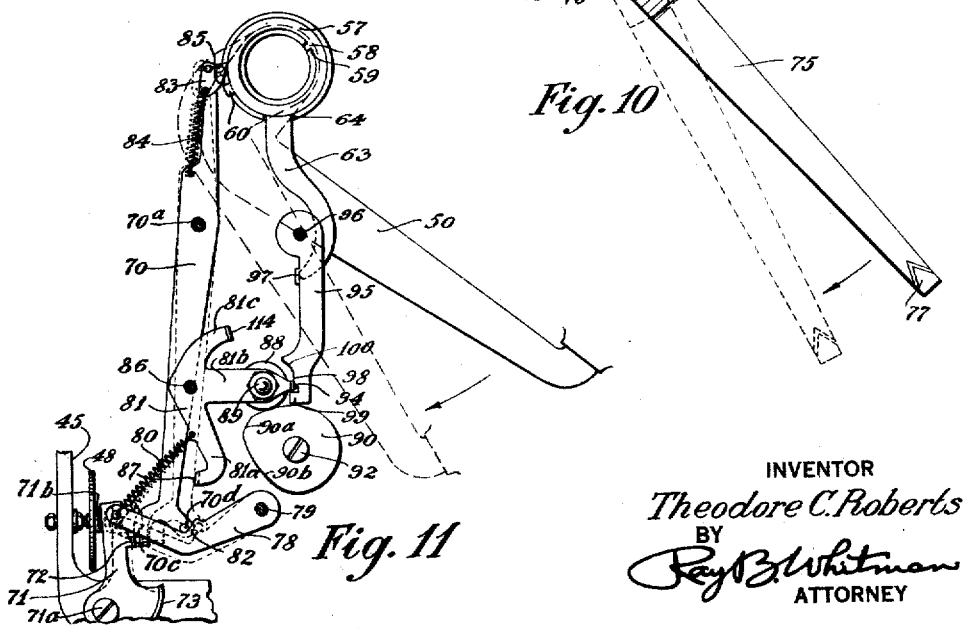

Figure 11 is a detached plan view showing the operation of the tone-arm start, the position shown in dotted lines being the starting position.

Figure 12 is a plan view, the switch being in cross-section, of a modified form of the invention as applied to operate the switch of an electric motor, the parts being shown in a position in which the automatic stopping mechanism has disconnected the switch, thereby breaking the circuit, and stopping the motor. The dotted lines show the stopping position of the manual start-and-stop lever.

Figure 13 is a similar view showing the switch in closed or playing position, the manual start-and-stop lever being in start position; this being the normal position when the automatic mechanism is in use.

Figure 14 is a perspective phantom view of the switch in open position, the casing being shown in dotted lines, and the parts carried therein in full lines.

Similar reference characters indicate corresponding parts throughout the various figures of the drawings.

Figure 3:
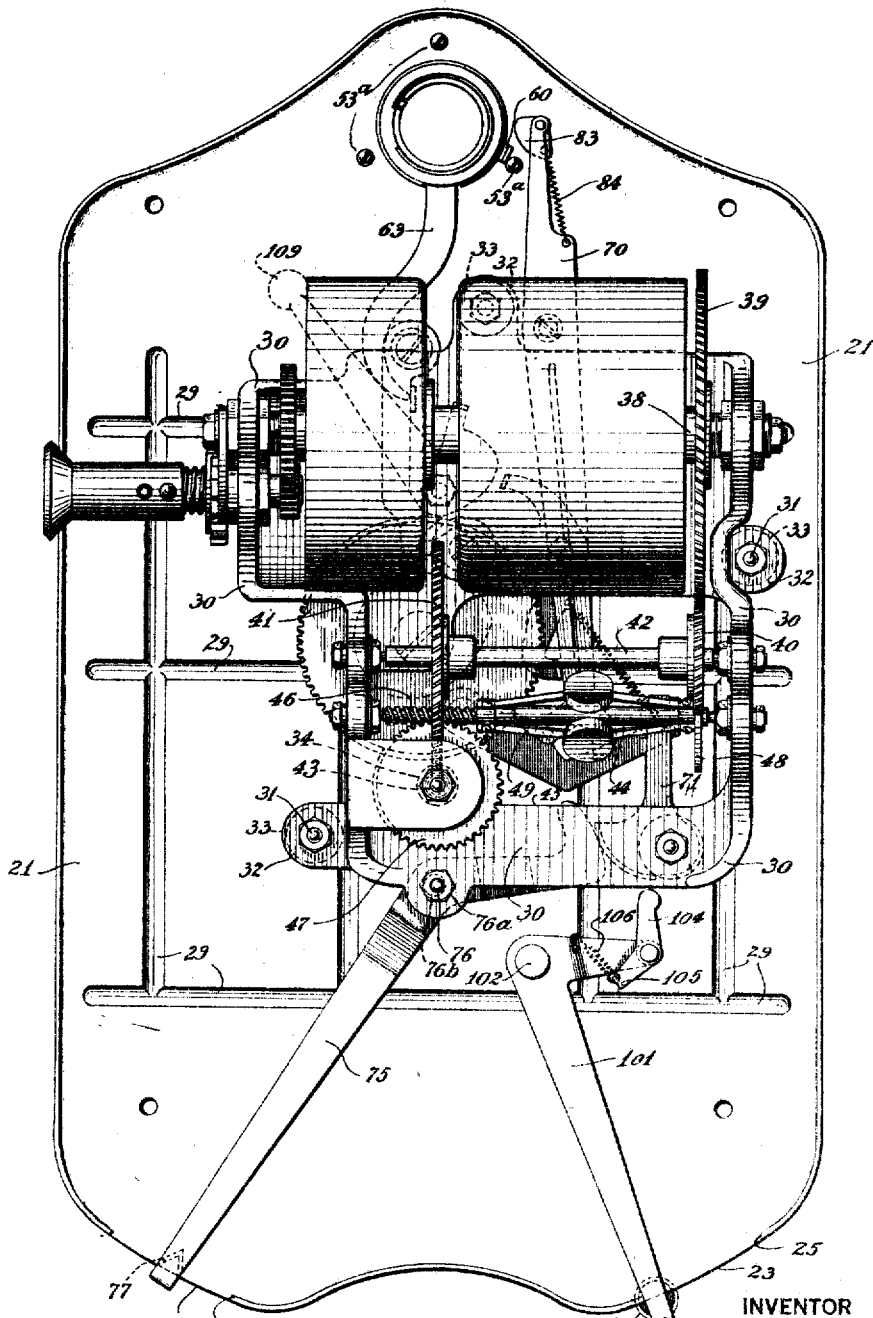
Figure 3 is a similar view, only taken from below.

The cabinet 20 (Fig. 1), includes a top board provided with a suitably shaped opening into which the motor unit depends, the metal motor-plate 21 extending over the opening and being secured to the top board by screws 21ᵃ, placed as shown. The motor-plate is flanged at its edges, its longitudinal sides being parallel, its rear end portion being shaped, as at 22, to provide a mounting for the tone-arm, while at its forward end, it is provided with portions 23 and 24 concentric to the turn-table, the flange being cut away adjacent these portions, as at 25 and 26, (Fig. 3), to accommodate the ends 103 and 77, (Fig. 1), of the manual start-and-stop lever and the speed-regulating lever, respectively, hereinafter more fully referred to, the plate being impressed along the portion 23, with the word "START" and an arrow, as at 27, and along the portion 24 with a graduated scale, having the letters S and F at its ends, as at 28.

The motor-plate is provided with ribs 29, stamped therein in semi-circular cross-section and in the form of a grid, which give it strength, rigidity, non-warping qualities, and also largely eliminate the transmission of vibration through it.

A motor carrying-frame 30, (Figs. 3 and 4), preferably formed of cast metal, is secured to the under side of the motor-plate by bolts and nuts 31 passing through raised brackets 32 formed on the frame, and suitably insulated by felt washers 33, the upper surface of the frame being substantially flat and spaced from the motor-plate, as shown more clearly in Figure 5.

The invention, as disclosed, includes a motor of the spring type mounted upon the frame 30, (Fig. 1), and which does not here need particular description except as regards the relation of the governor shaft and turn-table shaft to the other parts of the mechanism. The vertically disposed turn-table shaft 34 is journaled in bearings of the frame and extends, at its upper end, through an opening 35 of the motor-plate where it is provided with a tapered bushing 36 upon which the turn-table 37 is mounted. A train of worm gearing is arranged between the spring-driven motor shaft 38, (Fig. 3), and the turn-table shaft, comprising a large worm gear 39 on the motor shaft, small and large worm gears 40 and 41 provided on a horizontal jack-shaft 42, the gear 40 meshing with the gear 39, and a worm 43 on the turn-table shaft meshing with the gear 41. The governor shaft 44 is journaled in the frame horizontally beneath an opening 45 of the frame, and is provided with a worm 46 meshed by a worm gear 47 on the turn-table shaft. A governor disc 48, (Figs. 3 and 4), connected to the weight-carrying bowed springs 49 is slidable longitudinally of the governor shaft, and is adapted to be frictionally engaged, upon operation of the stop mechanism, to stop the motor, as will hereinafter more fully appear.

The tone-arm 50, (Figs. 1 and 2), carrying the reproducer 51, is mounted to have a limited vertical swinging movement in the elbow 52, the elbow being, in turn, rotatably mounted in the bore of the flanged base member 53, extending through an opening 54 (Fig. 5), in the motor-plate, and secured by screws 53ª, a shoulder 55 of the elbow engaging the upper end of the base member.

The depending lower end of the base member is annularly recessed, as at 56, and surrounds the depending end of the elbow which extends below the base member. Within the recess 56 there is disposed a flat ring 57, (Fig. 4), having an inwardly projecting lug 58, engaging a vertical key-slot 59 in the lower end of the elbow member so that the ring is locked to, and will rotate with the elbow member. An outwardly projecting, downwardly bent finger or lug 60, (Fig. 6), is provided on the ring 57 diametrically opposed to the lug 58, extending through an elongated slot 61 formed in the lower end of the base member 53, and having the double function of limiting the rotary movement of the elbow by engaging the ends of the slot, and of operating the automatic-starting mechanism, which latter function will be hereinafter more fully referred to.

Adjacent, and frictionally engaging the ring 57, there is provided a ring 62, having an integral projecting lever-arm 63, extending through a cut-out 64 in the lower end of the base member 53, the cut-out being slightly wider than the arm, to permit a limited movement thereof. The ring 62 is held against the ring 57 by a flat ring 65, a helical spring 66, a flat ring 67, of greater diameter than the recess 56, and disposed below the end of the base member 53, and a split spring ring 68 engaging a groove 69 in the lower end of the elbow member, the ring 67 also securing the elbow member within the base member. The end of the lever-arm 63 is curved outwardly and terminates in a point adapted to communicate the movement of the tone-arm to the stop mechanism, as will be presently more fully pointed out. The lever-arm 63 is adapted to have oscillatory movement, first in clockwise direction by its frictional connection with the tone-arm, and then in contra-clockwise direction by the action of the stop mechanism.

The several main parts of the stop-actuating mechanism are disposed in the space between the motor-plate 21 and the motor-frame 30 and are permanently mounted as a unit upon the motor-plate. In Figure 4, the bolts 70ª, 86, 96, 79, 102, and 108 secure these parts to the plate.

The automatic start-and-stop lever 70, (Figures 4 and 5), is pivoted upon the motor-plate 21 by means of a shouldered stud 70ª, spacing the lever from the plate, and is preferably provided with a longitudinal rib 70ᵇ to give it strength and rigidity against any tendency to twist or bend. At the end of its long arm, the lever 70 is provided with two projections,—the first a brake shoe projection, having its end bent up, as at 70ᶜ, to engage the brake-shoe lever, and the other, a cam lever projection provided with a pin 70ᵈ, to engage the cam lever 78, hereinafter more fully described.

The brake-shoe lever 71, (Figs. 4 and 7), is pivotally mounted upon the motor-frame by means of a screw 71ª, and is provided at its end with a brake shoe or pad 71ᵇ, adapted to be frictionally engaged with the governor disc 48 when the parts are in braking position, a lug 72 formed thereon, being disposed in the path of the end 70ᶜ of the lever 70.

In the non-braking position of the lever 70, the brake-shoe lever acts as a regulator for the governor, being provided with a flanged eccentrically curved lip 73, (Figs. 4 and 10), which, as the pad is released, moves under pressure of the governor disc until it engages the eccentric projection 74 of the speed-regulating lever 75 pivotally and adjustably mounted upon the motor-frame by means of a bolt 76, adapted to be adjustably fixed in position by a nut 76ª, at its threaded end, engaging the under side of the motor-frame, and having an eccentric bearing-shoulder 76ᵇ upon which the lever 75 is journaled. By turning the bolt its pivotal axis is shifted. The lever 75 is provided at the end of its long arm, which extends through the cut-out 26, (Fig. 3), of the motor-plate, with an index pointer 77 which is bent about the edge of the motor-plate above the scale markings 28. If the speed of the motor is not exactly at, say 80 revolutions per minute, with the pointer 77 at the center of the scale markings, the position of the pointer can be adjusted by turning the eccentric bolt, accessible through the opening 116, without removing the motor from the cabinet, until the lever 75 and its pointer 77 are again in midway position at the normal speed of 80 revolutions per minute.

The pin 70ᵈ, (Fig. 7), of the lever 70 engages a cam lever 78 pivotally mounted upon the motor-plate at 79, and yieldably held in engagement with the pin by a coiled spring 80, tying it to a three-armed roller-lever 81. The cam lever 78, (Fig. 4), is angular in shape, and at one side adjacent the angle is provided with a V-shaped cam projection 82. The pin 70ᵈ is adapted to be yieldably positioned at the base of the incline at either side of the cam projection 82, and as the lever 70 is forced from one position, to move with a quick snap action to the other position as the pin 70ᵈ passes the peak of the cam projection 82.

It will be understood that when the pin 70ᵈ is at the right hand side of the cam projection 82, the brake pad 71^b is released from engagement with the governor disc 48 so that the motor is free to run, but while it is at the other side of the projection, the lug 70^c of the lever 70 engages the lug 72 of the brake-shoe lever, forcing the brake shoe into frictional braking engagement with the governor disc. The pin 70^d is relatively long and extends, at its end, into a slot 70^e, (Figs. 1 and 2), provided in the motor-plate, so that any possibility of the parts becoming disengaged by jolting in transit, or from other causes, is prevented.

The starting of the motor is automatically brought about by movement of the tone-arm, from its non-playing position, to engagement with the first record groove, and to this end, the lever 70 is provided, at the end of its short arm, with a pivot-dog 83, (Figs. 4 and 7), yieldably held in normal position by spring 84, and having a cam portion 85 disposed in the path of the projecting finger 60, movable with the tone-arm.

In Fig. 11, there is illustrated, in full lines, the braking position of the parts, the tone-arm being in the rest position outside the periphery of the turn-table. It should be here pointed out that, as the tone-arm is moved from its inner position, at the end of the reproduction of a record, to its outer position, the finger 60 merely turns the dog 83 about its pivot without swinging the lever 70. In the movement of the tone-arm 50 in the outer direction,—as shown by the arrow,—the engagement of the finger 60 with the surface 85 of the dog, causes the lever 70 to be moved from the full line position to the dotted line position, this resulting from the fact that the surface 85 is at right angles to a line passing through the center of the pivot and the point of contact; the pin 70^d is forced over to the right hand side of the projection 82 of the cam lever, thus permitting the motor to run. While the finger 60 remains in engagement with the dog 83, and which corresponds to the movement of the stylus over an annular playing area, on a ten inch record, for instance, of about an inch, the lever 70 is locked against movement to its stopping position. This may be called a safety-zone to enable the tone-arm to be moved to playing position, without the possibility of the stop mechanism operating, should the stylus be moved back and forth, or held stationary.

The three-armed lever 81 is pivotally mounted upon the motor-plate at 86 between the lever 70 and the motor-plate, the arm 81^a, to which the spring 80 is secured, being bent toward the edge of the lever 70, and provided with a downwardly bent lip or lug 87 engaging the edge of the lever 70. The intermediate arm 81^b has its end portion bent downwardly, and then outwardly and in parallel relation to the under side of the motor-plate, and carries a roller 88 rotatably mounted on a stud bolt 89. The roller is preferably formed of emery stone, fibre, or other suitable material, and is adapted to ride upon the surface of a cam 90 secured to a large spur gear 91, (Fig. 4), rotatably mounted upon the motor-frame at 92, and engaged by a pinion gear 93 provided upon the turn-table shaft 34.

The extremity of the arm 81^b is tapered, and projects beyond the roller 88, and is provided with an upwardly bent lug 94 adapted to co-operate with a latch lever 95 pivotally mounted on the motor-plate at 96. A downwardly bent lug 97 is formed at the edge of the latch lever, relatively near its pivot, and is adapted to be engaged by the pointed end of the arm 63 to oppose the clockwise movement thereof. The end portion of the latch lever is provided with a recess 98, having a supporting ledge 99 formed at its lower end, adapted to be engaged by, and to support the end of the arm 81^b in the clockwise moved position thereof. At its upper end, the recess is provided with an inclined cam surface 100, projecting beyond the ledge portion 99.

The operation of these parts is as follows—

Assume that the motor has been started, as above pointed out, and the tone-arm is traveling toward the center of the record through the tracking of the stylus in the record groove. Through the pinion 93 and gear 91, the cam 90 is rotated in reduced ratio to the turn-table, (about 1 to 4), and as the high part 90^a thereof, passes the roller 88, the lever 81 is rocked in contra-clockwise direction so that the lug 94 rides along the cam surface 100, forcing both the lever 95 and the arm 63 in contra-clockwise direction, against the opposite propelling force of the tone-arm. As the high part 90^a of the cam leaves the roller, the lever 81 recedes and the lever 95 moves in practically hugging relation to the lug 94, through the frictional propelling force of the traveling tone-arm, so that before the lowest part 90^b of the cam 90 is reached, the ledge-portion 99 of the lever 95 moves into the path of lug 94, preventing the lever 81 from moving to its extreme clockwise moved position, that is, to its position where the roller 88 is engaged with the lowest part of the cam.

As the reproducer reaches the end of the record, the stylus tracks in a circular groove, so that the tone-arm ceases to travel inwardly. When this condition occurs, the latch lever 95, after it has been moved by the cam portion 100 out of engagement with the lug 94, will not be returned, as before, by the movement of the tone-arm. Hence, the ledge-portion 99 will remain out of the path of the lug 94 as the lever 81 recedes, and the roller will, therefore, be free to assume its extreme position in engagement with the lowest part 90ᵇ of the cam 90. Thus, the lever 81 will be rotated to such position that the end 87 will force the lever 70 in clockwise direction, through the action of the spring 80, moving the pin 70ᵈ to engagement with the left hand side of the cam projection 82 of the cam lever 78, at the same time, applying the brake pad 71ᵇ, through engagement of the lugs 70ᶜ and 72, and thereby stopping the motor.

The reproducer may now be lifted from the record and moved to the "rest" position, outside the periphery of the turntable, without positive actuation of the start mechanism, the projecting finger 60 engaging and rotating the dog 83 without imparting movement to the lever 70. In order to start the machine again, the tone-arm is moved to the first record groove, causing the finger or lug 60 to swing the lever 70, releasing the brake-shoe lever 71 from the governor disc 48, and setting the parts in open or motor-running position, as shown in Figs. 4 and 7, with the pin 70ᵈ disposed at the right hand side of the cam projection 82 of the cam lever 78.

In order to start and stop the motor manually, and independently of the automatic mechanism, there is provided an elbow lever 101, (Figs. 3 and 8), pivotally mounted upon the motor-plate at 102, its long arm extending through the cut-out 25 in the edge of the motor-plate, and being provided with a knob 103 disposed over the word "Start" inscribed on the plate. Upon the end of the short arm of the lever 101, there is pivotally mounted a spring pawl 104, provided at its inner end with a lug 105 held yieldably against the edge of the lever by a spring 106, its outer end being projected toward the curved lip 73 of the brake-shoe lever 71. As shown in Fig. 8, the brake lever is normally applied by the movement of the lever 101 from the open position, shown in full lines, to the closed position, shown in dotted lines, the spring pawl preventing excessive pressure on the brake shoe, and the possibility of any damage that might result therefrom. It will be understood that when the automatic stop is being used, the lever 101 will not be used, and should remain in the open or "Start" position.

Figure 1:
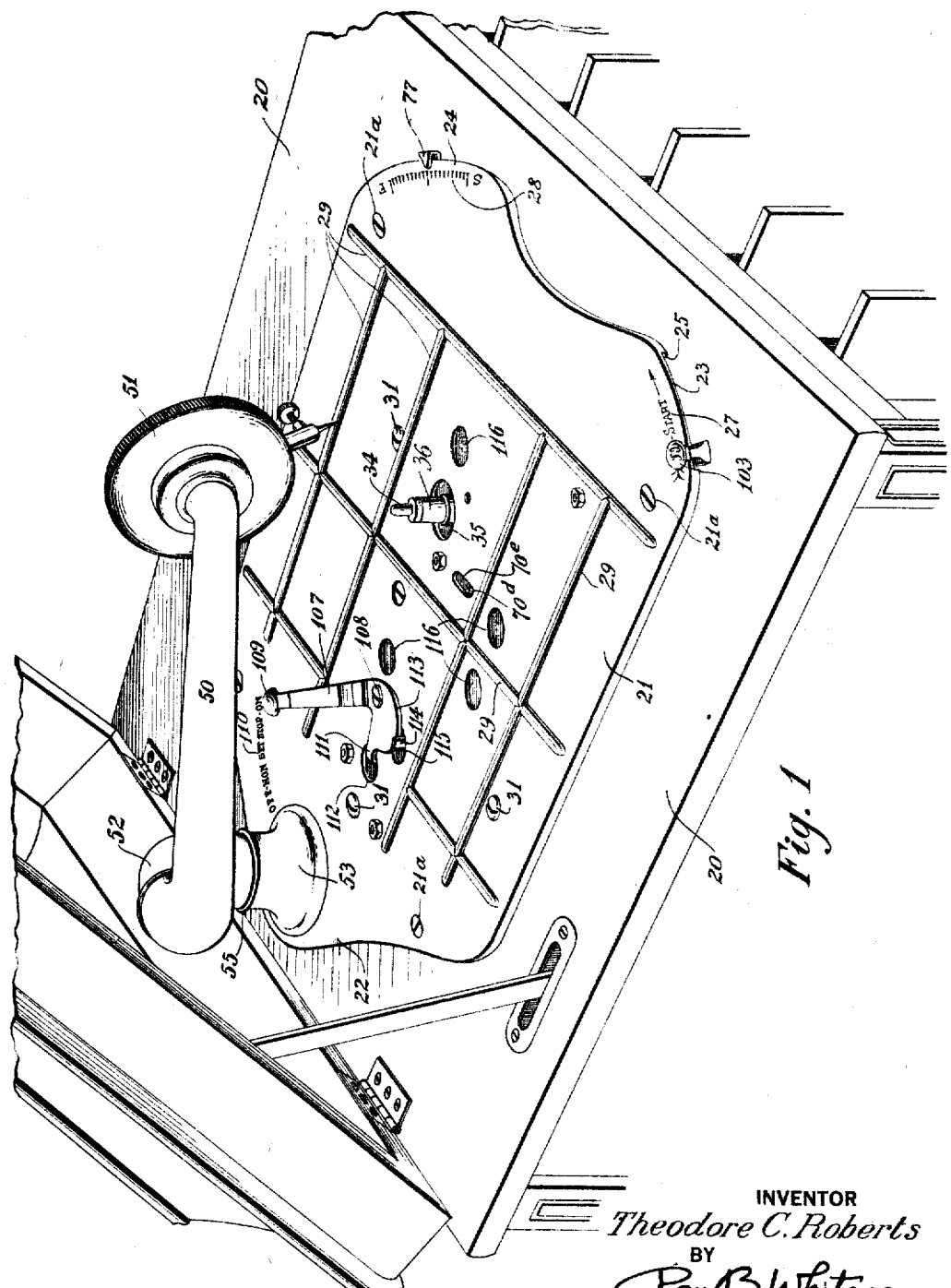
Figure 1 is a perspective view of a well-known type of phonograph provided with these improvements,—the turn-table having been removed to show more clearly the parts normally beneath it.

The automatic stop mechanism may be rendered inoperative, when desired, whether the motor is running or not, by means of the lever 107, shown more clearly in Figs. 1, 2, and 9, pivoted at 108 upon the upper side of the motor-plate, and provided at its outer end with a knob 109 projecting beyond the periphery of the turn-table, and disposed in proper relation to the words "Off—Non-set—Stop—On" inscribed, as at 110, upon the plate.

The lug 111 on the lever 107 engages the edge of an aperture 112, (Figs. 1 and 2), formed in the motor-plate, and limits its movement between the "On" and "Off" positions; a cam surface 113 of the lever is adapted to be engaged with, and disengaged from, a projection 114 formed on the third arm 81ᶜ of the lever 81, and projecting upwardly through an aperture 115 in the motor-plate, to respectively render the automatic stop mechanism inoperative or operative. It is clear that in the inoperative position, the lever 81 is held from oscillatory movement by engagement of the lever 107 therewith.

Aperture 116, formed in the motor-plate, permits the essential parts of the mechanism to be readily seen, upon removal of the turn-table, and to be conveniently accessible for oiling.

In Figures 12 to 14 inclusive, there is shown a modification in which the invention is adapted to an electric motor, and in which, instead of a brake, a switch is employed to shut off and supply current. The switch structure comprises a box portion 117 of fibre, or other suitable insulating material, provided with a cam plate 118 of similar material, secured thereto by bolts 119, and provided with four posts 120, to the upper two of which the circuits from the source of power are connected, and to the lower two of which the wires of the motor are connected. The posts are each provided, within the box, with spring contact members 121 spaced from each other and having curved jaws bent toward and spaced from each other, and adapted to have the circuit closed between them by means of wedge-shaped contacts 122 and 123 mounted upon an insulating block 124, slidable longitudinally within the box, and to which is connected the end of a bar 125, extending through a slot 126 in the rear wall of the box. A coil spring 127, tied between the bar 125 and the motor-frame, normally forces the bar inwardly, and the contacts 122 and 123 into contact with the members 121, to close the circuit.

At its outer end, the bar 125 is slotted at 128, and is engaged by the bent end 129 of the automatic start-and-stop lever 130. With the exception of its end portion, this lever is similar to the lever 70 of the first described embodiment, and is provided with a pin 131 engaging the lever 78, the operation being similar to that of the lever 70. Upon automatic stopping, the lever 130 is moved to the position shown in Figure 12, drawing the bar 125 outwardly against the force of the spring 127, and holding the switch open, through engagement of the pin 131 with the left hand side of the projection 82. When the motor is to be started, the lever 130 is moved in contra-clockwise direction by movement of the tone-arm to playing position, engaging the pin 131 at the right hand side of the projection 82, releasing the bar 125 so that the spring 127 draws it to circuit-closing position.

In order to open and close the switch manually, and independently of the automatic mechanism, a lever 132 is provided, pivotally mounted upon the motor-frame at 133, and having a stud-bolt 134 engaging a slot 135 of the bar 125. At its outer end, a knob 136 is formed which is bent about the edge of the motor-plate and moves above the "Start" inscription on the plate, and frictionally engaging the plate's surface, so that as it is moved from the full line position (Figure 13), to the dotted line position (Figure 12), it stays in such positions, thereby holding the bar 125 against the force of the spring 127.

It will be understood that while in the illustrated embodiments of the invention, a particular type of brake, and a particular type of electric switch is disclosed, other forms of stop devices may be employed in connection with the improvements. Thus, instead of engaging a brake with the governor disc 48, there may be provided a turntable engaging brake, to be actuated by the automatic start-and-stop lever. While, therefore, there is illustrated and described a preferred and satisfactory embodiment of the invention, it will be obvious that changes may be made therein within the spirit and scope thereof, as defined in the appended claims.

Having now described the invention, what is claimed as new and for which Letters Patent of the United States is desired, is:

1. In combination, a traveling element, a rotating element, stop mechanism, a pivoted lever adapted to actuate the stop mechanism to stopping or non-stopping position, a cam lever engaging the pivoted lever to retain it yieldably in either of its moved positions, an oscillating lever adapted, in one direction of movement, to engage the pivoted lever and move it to stopping position, means co-operating with the rotating element to oscillate the oscillating lever, a pivoted latch adapted to lock the actuating member in non-stopping position, a follower finger for the pivoted latch in frictional engagement with the traveling element, said latch having a locking portion and a camming portion, the locking portion adapted to prevent movement of the oscillating lever to stopping position, the camming portion adapted, as the oscillating lever is oscillated away from stopping position, to move the locking portion of the latch out of locking relation with the oscillating lever, the latch adapted to release the oscillating lever when the traveling element ceases to travel.

2. In combination, a traveling element, a rotating element, stop mechanism, a pivoted lever adapted to actuate the stop mechanism to stopping or non-stopping position, a cam lever engaging the pivoted lever to retain it yieldably in either of its moved positions, an oscillating lever adapted, in one direction of movement, to engage the pivoted lever and move it to stopping position, means co-operating with the rotating element to oscillate the oscillating lever, a pivoted latch adapted to lock the actuating member in non-stopping position, a follower finger for the pivoted latch in frictional engagement with the traveling element, means to maintain the latch in locking engagement with the oscillating lever while the traveling element is traveling, and adapted to release the oscillating lever when the traveling element ceases to travel.

3. In combination, a traveling element, a rotating element, stop mechanism, a pivoted lever adapted to actuate the stop mechanism to stopping or non-stopping position, a cam lever engaging the pivoted lever to retain it yieldably in either of its moved positions, an oscillating lever adapted, in one direction of movement, to engage the pivoted lever and move it to stopping position, means co-operating with the rotating element to oscillate the oscillating lever, and means co-operating with the oscillating lever to maintain it in its non-stopping position.

4. In combination, a traveling element, a rotating element, stop mechanism, a pivoted member adapted to actuate the stop mechanism to stopping or non-stopping position, means co-operating with the rotating element to move the pivoted member to stopping position, and means co-operating with the traveling element to move the pivoted member to non-stopping position.

5. In combination, a traveling element, a rotating element, stop mechanism, a pivoted member adapted to actuate the stop mechanism to stopping or non-stopping position, means co-operating with the rotating element to move the pivoted member to stopping position, and means co-operating with the traveling element to move the pivoted member to non-stopping position as the traveling element is moved inwardly to the initial playing position.

6. In combination, a traveling element, a rotating element, stop mechanism, a pivoted member adapted to actuate the stop mechanism to stopping or non-stopping position, means co-operating with the rotating element to move the pivoted member to stopping position, a lug movable with the traveling element adapted 'o engage the pivoted member to move it to non-stopping position as the traveling element is moved to initial playing position.

7. In combination, a traveling element, a rotating element, stop mechanism, a pivoted member adapted to actuate the stop mechanism to stopping or non-stopping position, means co-operating with the rotating element to move the pivoted member to stopping position, a lug, movable with the traveling element, adapted to engage the pivoted member to move it to non-stopping position as the traveling element is moved to initial playing position, the lug adapted to remain in engagement with the pivoted member as the traveling element is disposed within a substantial annular area inwardly of the initial playing position, and adapted, through such engagement, to prevent actuation of the pivoted member to stopping position.

8. In combination, a traveling element, a rotating element, stop mechanism, a pivoted lever co-operating, at one end, with the stop mechanism to actuate it to stopping or non-stopping position, means co-operating with the rotating element to move the pivoted member to stopping position, and means, movable with the traveling element, adapted to co-operate with the other end of the pivoted lever and actuate it to non-stopping position as the traveling element is moved to initial playing position.

9. In combination, a traveling element, a rotating element, stop mechanism, a pivoted lever adapted to actuate the stop mechanism to stopping position, an oscillating member actuated by the rotating element and adapted, in one direction of movement, to engage the pivoted lever to move it to stopping position, and means co-operating with the oscillating member to maintain it in its non-stopping position while the traveling element is traveling.

10. In combination, a traveling element, a rotating element, stop mechanism, a pivoted lever adapted to actuate the stop mechanism to stopping position, an oscillating member actuated by the rotating element and adapted, in one direction of movement, to engage the pivoted lever to move it to stopping position, a cam lever engaging the pivoted lever to retain it yieldably in either of its moved positions, and means co-operating with the stop mechanism to maintain it in its non-stopping position while the traveling element is traveling.

11. In combination, a traveling element, a rotating element, stop mechanism, a pivoted lever adapted to actuate the stop mechanism to stopping position, an oscillating member actuated by the rotating element and adapted, in one direction of movement, to engage the pivoted lever to move it to stopping position, a cam lever engaging the pivoted lever to retain it yieldably in either of its moved positions, and having a peaked cam position adapted, as the lever is moved from its highest point in either direction, to cause relatively quick completion of the movement.

12. In combination, a traveling element, a rotating element, stop mechanism, a pivoted lever adapted to actuate the stop mechanism to stopping position, an oscillating member actuated by the rotating element and adapted, in one direction of movement, to engage the pivoted lever to move it to stopping position, a cam lever engaging the pivoted lever to retain it yieldably in either of its moved positions, spring means exerting a force on the cam lever in a direction substantially longitudinally of the pivoted lever, and upon the oscillating lever substantially transversely of the pivoted lever, and means cooperating with the oscillating lever to maintain it in its non-stopping position while the traveling element is traveling.

13. In combination, a traveling element, a rotating element, stop mechanism, a pivoted lever adapted to actuate the stop mechanism to stopping position, an oscillating member actuated by the rotating element and adapted, in one direction of movement, to engage the pivoted lever to move it to stopping position, a cam lever engaging the pivoted lever to retain it yieldably in either of its moved positions, spring means exerting a force on the cam lever in a direction substantially longitudinally toward the pivoted lever, and upon the oscillating lever, substantially transversely toward the pivoted lever, and means co-operating with the oscillating lever to maintain it in its non-stopping position while the traveling element is traveling.

14. In combination, a traveling element, a rotating element, stop mechanism, a pivoted lever adapted to actuate the stop mechanism to stopping position, an oscillating member actuated by the rotating element and adapted, in one direction of movement, to engage the pivoted lever to move it to stopping position, a cam lever engaging the pivoted lever to retain it yieldably in either of its moved positions, means co-operating with the rotating element to oscillate the oscillating lever, spring means exerting a force on the cam lever to engage it with the pivoted lever, and upon the oscillating lever to engage it with the means co-operating with the rotating element, and means co-operating with the oscillating lever to maintain it in its non-stopping position while the traveling element is traveling.

15. In combination, a traveling element, a rotating element, stop mechanism, a pivoted lever adapted to actuate the stop mechanism to stopping position, an oscillating member actuated by the rotating element and adapted, in one direction of movement, to engage the pivoted lever to move it to stopping position, a cam lever engaging the pivoted lever to retain it yieldably in either of its moved positions, a spring exerting a force on the cam lever in a direction substantially longitudinally of the pivoted lever, and upon the oscillating lever substantially transversely of the pivoted lever, and means co-operating with the oscillating lever to maintain it in its non-stopping position while the traveling element is traveling.

16. In combination, a traveling element, a rotating element, stop mechanism, an actuating member therefor, a follower finger frictionally driven by the traveling element, a latch actuated by the finger to engage the stop-actuating member, the follower finger adapted to move the latch into position to limit each movement of the stop-actuating member in stop-actuating direction while the traveling element travels, and means adapted to prevent the locking of the latch therewith when the traveling element has stopped to permit the stop mechanism to operate.

17. In combination, a traveling element, a rotating element, stop mechanism, a stop-mechanism-actuating member, a follower finger in frictional engagement with the traveling element, means co-operating with the rotating element to oscillate the actuating member, a pivoted latch adapted to lock the actuating member in non-stopping position, means co-operating with the rotating element to oscillate the actuating member, and means adapted to maintain the latch in locking engagement with the actuating member while the traveling element is traveling and adapted to release the actuating member when the traveling element ceases to travel.

18. In combination, a traveling element, a rotating element, stop mechanism, a stop-mechanism-actuating member, a follower finger in frictional engagement with the traveling element, means co-operating with the rotating element to oscillate the actuating member, a pivoted latch having a locking portion and a camming portion, the locking portion adapted to prevent movement of the actuating member to stopping position, the camming portion adapted, as the actuating member is oscillated away from stopping position, to move the locking portion of the latch out of locking relation with the actuating member, and means adapted to engage the latch in locking engagement with the actuating member while the traveling element is traveling and adapted to release the actuating member when the traveling element ceases to travel.

19. In a stop mechanism, the combination with two independently moving elements, of stop means and an actuating member therefor, means for imparting impulses to the actuating member, means rendered operative by the movement of one of the elements for limiting the impulses of the actuating member in one direction, but rendered inoperative by the actuating member when the movement of such element ceases, to enable the continuation of its movement to effective position to actuate the stop means.

20. In a stop mechanism, the combination with two independently moving elements, of stop means and an actuating member therefor, means for imparting impulses in opposite directions to the actuating member, means rendered operative by the movement of one of the elements for limiting the impulses of the actuating member in one direction, and means associated with the actuating member for rendering the next-above-mentioned means inoperative when the movement of the element ceases, thereby enabling the actuating member to continue its movement to effective stopping position to stop the movement of the other moving element.

21. In a brake mechanism, the combination with a traveling element, and a rotating element, of a brake element, a pivoted lever adapted to actuate the brake element to stopping or non-stopping position, an oscillating member adapted, in one direction of movement, to actuate the pivoted lever to stopping position, means associated with the rotating element and traveling element for controlling the brake element, including a mechanism for oscillating the oscillating member, and a latch actuated by the traveling element, to limit the movement of the oscillating member toward its operative position, the latch being rendered inoperative, by the oscillation of the brake element in the opposite direction, to enable the oscillating member on its next oscillation to move the brake element to operative position.

22. In a brake mechanism, the combination with a traveling element, and a rotating element, of a brake element, an oscillating member operatively related to the brake element, means associated with the traveling element and rotating element for controlling the brake element, comprising mechanism for oscillating the oscillating member, and a latch actuated by the traveling element, to limit the movement of the oscillating member toward its operative position, the latch being rendered inoperative by the oscillation of the brake element in the opposite direction, to enable the oscillating member on its next oscillation to move the brake element to operative position.

23. In combination, a traveling element, a rotating element, stop mechanism, means, including a cam co-operating with the rotating element, to actuate the stop mechanism, and means co-operating with the stop mechanism, to positively prevent its functioning while the traveling element is traveling.

24. In combination, a traveling element, a rotating element, stop mechanism, actuating means therefor adapted to have to and fro movement, and means co-operating with the actuating means to limit its movement in stop-actuating direction, and acting when the traveling element stops to permit such stop-actuating movement.

25. In combination, a traveling element, a rotating element, stop mechanism for the rotating element, a movable member adapted to have to and fro movement and adapted to actuate the stop mechanism through its movement in one direction, means adapted through the travel of the traveling element to intercept the stop-actuating movement of the movable member, the movable member acting when the traveling element stops to actuate the stop mechanism.

26. In combination, a traveling element, a rotating element, a stop lever, stop mechanism adapted to be actuated by a movable member adapted to have to and fro movement and adapted to move the stop lever to stop-actuating position through its movement in one direction, means adapted through the travel of the traveling element to intercept the stop-actuating movement of the movable member, the movable member acting when the traveling element stops to actuate the stop lever.

27. In combination, a traveling element, a rotating element, means to stop the rotating element upon the stopping of the traveling element, and means adapted to positively prevent the operation of the first named means prior to a pre-determined initial traverse of the traveling element.

28. In combination, a traveling element, a rotating element, means to stop the rotating element upon the stopping of the traveling element, and means adapted to positively prevent the operation of the first named means during the movement of the traveling element within the limits of a given area, and to permit such operation upon stopping of the traveling element beyond such given area.

29. In combination, a traveling element, a rotating element, a motor for actuating the rotating element, including a governor having a movable speed-regulating part, a brake shoe adapted to engage this part to stop the motor and to occupy varying positions to limit the movement of the speed-regulating part, and thereby, the speed of the motor, a regulating lever arranged to regulate the position of the brake shoe in its non-stopping position, a movable member co-operatively related to the brake shoe and adapted to have to and fro movement to move the brake shoe to stopping position through its movement in one direction, means adapted, through the travel of the traveling element, to intercept the stop-actuating movement of the movable member, the movable member acting, when the traveling element stops, to actuate the brake shoe to stopping position.

30. In combination, a traveling element, a rotating element, a motor for actuating the rotating element, including a governor having a movable speed-regulating part, a variable limiting member adapted to determine the running zone of this part, a regulating lever adapted to adjust the position of the limiting member, and means adapted to stop the motor upon the stopping of the traveling element.

31. In combination, a traveling element, a rotating element, a motor for actuating the rotating element, including a governor having a movable speed-regulating part, a brake shoe member adapted to engage this part to stop the motor, and to be released therefrom to permit starting, a pivoted start-and-stop lever co-operatively related to the brake shoe member, and adapted, in one position to move it to stopping position, and in its other position to release it, and means adapted to automatically move the start-and-stop lever to stopping position upon the stopping of the traveling element.

32. In combination, a traveling element, a rotating element, a motor for actuating the rotating element, including a governor having a movable speed-regulating part, a brake shoe member adapted to engage this part to stop the motor, and to be released therefrom to permit starting, a pivoted start-and-stop lever co-operatively related to the brake shoe member, and adapted, in one position, to move it to stopping position, and in its other position to release it, and means, actuated by the motor, adapted to stop the motor upon the stopping of the traveling element.

33. In combination, a traveling element, a rotating element, a motor for actuating the rotating element, including a governor having a movable speed-regulating part, a brake shoe member adapted to engage this part to stop the motor, and to be released therefrom to permit starting, a pivoted start-and-stop lever co-operatively related to the brake shoe member, and adapted, in one position to move it to stopping position, and in its other position to release it, means adapted to automatically move the start-and-stop lever to stopping position upon the stopping of the traveling element, and means adapted to move the start-and-stop lever to starting position.

34. In a phonograph, the combination of a traveling element, a rotating element, a motor for actuating the rotating element, including a governor having a movable speed-regulating part, a brake shoe member adapted to engage this part to stop the motor, and to be released therefrom to permit starting, a pivoted start-and-stop lever co-operatively related to the brake shoe member, and adapted, in one position to move it to stopping position, and in its other position to release it, means adapted to automatically move the start-and-stop lever to stopping position upon the stopping of the traveling element, and means co-operatively related to the traveling element and adapted to move the start-and-stop lever to starting position upon the movement of the traveling element to initial playing position.

35. In a phonograph, the combination of a traveling element, a rotating element, a motor for actuating the rotating element, including a governor having a movable speed-regulating part, a brake shoe member adapted to engage the regulating part to stop the motor, and to be released therefrom to permit starting, a pivoted start-and-stop lever co-operatively related to the brake shoe member, and adapted, in one position to move it to stopping position, and in its other position to release it, means adapted to automatically move the start-and-stop lever to stopping position upon the stopping of the traveling element, and means co-operatively related to the traveling element, and adapted to move the start-and-stop lever to starting position upon the movement of the traveling element from its "rest" position outside the periphery of the rotating element to its initial playing position.

36. In a phonograph, the combination of a traveling element, a rotating element, a motor for actuating the rotating element, including a governor having a movable speed-regulating part, a brake shoe member adapted to engage this part to stop the motor, and to be released therefrom to permit starting, a pivoted start-and-stop lever co-operatively related to the brake shoe member, and adapted, in one position to move it to stopping position, and in its other position to release it, means adapted automatically to move the start-and-stop lever to stopping position upon the stopping of the traveling element, and means co-operatively related to the traveling element, and adapted to move the start-and-stop lever to starting position upon the movement of the traveling element from its "rest" position outside the periphery of the rotating element to its initial playing position, and adapted to be inoperative to actuate the start-and-stop lever during movement from the final playing position of the rotating element to "rest" position.

37. In a phonograph, the combination of a traveling element, a rotating element, a motor for actuating the rotating element, including a governor having a movable speed-regulating part, a brake shoe member adapted to engage this part to stop the motor, and to be released therefrom to permit starting, a pivoted start-and-stop lever co-operatively related to the brake shoe member, and adapted, in one position to move it to stopping position, and in its other position to release it, means adapted to automatically move the start-and-stop lever to stopping position upon the stopping of the traveling element, means co-operatively related to the traveling element and adapted to move the start-and-stop lever to starting position upon the movement of the traveling element to the initial playing position, and means adapted to prevent the movement of the start-and-stop lever prior to a predetermined initial traverse of the traveling element.

38. In a phonograph, the combination with a traveling element and a rotating element, of start-and-stop mechanism including an eccentric cam actuated by the rotating element, and including means cooperating with the cam and adapted to automatically stop the rotating element upon stopping of the traveling element, and to automatically start the rotating element upon the movement of the traveling element to its initial playing position from a position outside the periphery of the rotating element.

39. In a phonograph, the combination with a traveling element and a rotating element of start-and-stop mechanism including an eccentric cam actuated by the rotating element, and including means co-operating with the cam and adapted to automatically stop the rotating element upon stopping of the traveling element, and to automatically start the rotating element upon the movement of the traveling element to its initial playing position from a position outside the periphery of the rotating element, said means being inoperative when the traveling element is moved from its final playing position to its position outside the periphery of the turntable.

40. In combination, a traveling element, a rotating element, a motor for actuating the rotating element, including a governor having a movable speed-regulating part, a brake shoe member adapted to engage this part to stop the motor, and to be released therefrom to permit starting, a pivoted start-and-stop lever co-operatively related to the brake shoe member, and adapted, in one position to move it to stopping position, and in its other position to release it, means adapted to automatically move the start-and-stop lever to stopping position upon the stopping of the traveling element, and eliminator means adapted to render the automatic means inoperative.

41. In combination, a traveling element, a rotating element, a motor for actuating the rotating element, including a governor having a movable speed-regulating part, a brake shoe member adapted to engage this part to stop the motor, and to be released therefrom to permit starting, a pivoted start-and-stop lever co-operatively related to the brake shoe member, and adapted, in one position to move it to stopping position, and in its other position to release it, means adapted to automatically move the start-and-stop lever to stopping position upon the stopping of the traveling element, eleiminator means adapted to render the automatic means inoperative, and manually operable means adapted to actuate the brake shoe independently of the automatic means.

42. In combination, a traveling element, a rotating element, a motor for actuating the rotating element, including a governor having a movable speed-regulating part, a brake shoe member adapted to engage this part to stop the motor, and to be released therefrom to permit starting, a pivoted start-and-stop lever co-operatively related to the brake shoe member, and adapted, in one position to move it to stopping position, and in its other position to release it, means adapted to automatically move the start-and-stop lever to stopping position upon the stopping of the traveling element, and eliminator means adapted to render the automatic means inoperative, and permitting the manual operation of the pivoted start-and-stop lever.

43. In a phonograph, the combination of a traveling element, a rotating element, a motor for actuating the rotating element, including a governor having a movable speed-regulating part, a brake shoe member adapted to engage this part to stop the motor, and to be released therefrom to permit starting, a pivoted start-and-stop lever co-operatively related to the brake shoe member, and adapted, in one position to move it to stopping position, and in its other position to release it, means adapted to automatically move the start-and-stop lever to stopping position upon the stopping of the traveling element, and a regulating member adapted to determine the playing positinon of the brake shoe.

44. In combination, a traveling element, a rotating element, a motor for actuating the rotating element, start-and-stop mechanism for the motor, a start-and-stop lever co-operatively related thereto, and adapted, in one position to actuate it to stopping position, and in its other position to actuate it to starting position, and means adapted to automatically move the start-and-stop lever to stopping position upon the stopping of the traveling element.

45. In combination, a traveling element, a rotating element, a motor for actuating the rotating element, start-and-stop mechanism for the motor, a start-and-stop lever co-operatively related thereto, and adapted, in one position to actuate it to stopping position, and in its other position to actuate it to starting position, and means, actuated by the motor, adapted to automatically move the start-and-stop lever to stopping position upon the stopping of the traveling element.

46. In combination, a traveling element, a rotating element, a motor for actuating the rotating element, start-and-stop mechanism for the motor, a start-and-stop lever co-operatively related thereto, and adapted in one position to actuate it to stopping position, and in its other position to actuate it to starting position, means adapted to automatically move the start-and-stop lever to stopping position upon the stopping of the traveling element, and means adapted to move the start-and-stop lever to starting position.

47. In a phonograph, the combination of a traveling element, a rotating element, a motor for actuating the rotating element, a start-and-stop mechanism for the motor, a start-and-stop lever co-operatively related thereto, and adapted in one position to actuate it to stopping position, and in its other position to actuate it to starting position, means adapted to automatically move the start-and-stop lever to stopping position upon the stopping of the traveling element, and means co-operatively related to the traveling element, and adapted to move the start-and-stop lever to starting position upon movement of the traveling element to initial playing position.

48. In a phonograph, the combination of a traveling element, a rotating element, a motor for actuating the rotating element, a start-and-stop mechanism for the motor, a start-and-stop lever co-operatively related thereto, and adapted in one position to actuate it to stopping position, and in its other position to actuate it to starting position, means adapted to automatically move the start-and-stop lever to stopping position upon the stopping of the traveling element, and means co-operatively related to the traveling element, and adapted to move the start-and-stop lever to starting position upon movement of the traveling element from its "rest" position outside the periphery of the rotating element to its initial playing position.

49. In a phonograph, the combination of a traveling element, a rotating element, a motor for actuating the rotating element, a start-and-stop mechanism for the motor, a start-and-stop lever co-operatively related thereto, and adapted in one position to actuate it to stopping position, and in its other position to actuate it to starting position, means adapted to automatically move the start-and-stop lever to stopping position upon the stopping of the traveling element, and means co-operatively related to the traveling element, and adapted to move the tart-and-stop lever to starting position upon movement of the traveling element from its "rest" position outside the periphery of the rotating element, to its initial playing position, and adapted to be inoperative to actuate the start-and-stop lever during movement from the final playing position of the traveling element to the "rest" position.

50. In a phonograph, the combination of a traveling element, a rotating element, a motor for actuating the rotating element, start-and-stop mechanism for the motor, a start-and-stop lever co-operatively related thereto, and adapted in one position to actuate it to stopping position, and in its other position to actuate it to starting position. means adapted to automatically move the start-and-stop lever to stopping position upon the stopping of the traveling element, means co-operatively related to the traveling element, and adapted to move the start-and-stop lever to starting position upon movement of the traveling element to initial playing position, and means adapted to prevent the movement of the start-and-stop lever prior to a predetermined traverse of the traveling element.

51. In combination, a traveling element, a rotating element, a motor for actuating the rotating element, start-and-stop mechanism for the motor, a start-and-stop lever co-operatively related thereto, and adapted in one position to actuate it to stopping position, and in its other position to actuate it to starting position, means adapted to automatically move the start-and-stop lever to stopping position upon the stopping of the traveling element, and eliminator means adapted to render the automatic means inoperative.

52. In combination, a traveling element, a rotating element, a motor for actuating the rotating element, start-and-stop mechanism for the motor, a start-and-stop lever co-operatively related thereto, and adapted in one position to actuate it to stopping position, and in its other position to actuate it to starting position, means adapted to automatically move the start-and-stop lever to stopping position upon the stopping of the traveling element, eliminator means adapted to render the automatic means inoperative, and manually operable means adapted to actuate the brake shoe independently of the automatic means.

53. In combination, a traveling element, a rotating element, a motor for actuating the rotating element, start-and-stop mechanism for the motor, a start-and-stop lever co-operatively related thereto, and adapted in one position to actuate it to stopping position, and in its other position to actuate it to starting position, means adapted to automatically move the start-and-stop lever to stopping position upon the stopping of the traveling element, and eliminator means adapted to render the automatic means inoperative, and permitting manual operation of the pivoted start-and-stop lever.

54. In combination, a traveling element, a rotating element, a motor for actuating the rotating element, including a governor having a movable speed-regulating part, a member co-operatively related to this part, and adapted to determine the running zone thereof, start-and-stop mechanism for the motor, and means adapted to automatically move the start-and-stop mechanism to stopping position upon the stopping of the traveling element.

55. In combination, a traveling element, a rotating element, a motor for actuating the rotating element, including a governor having a movable speed-regulating part, a member co-operatively related to this part, and adapted to determine the running zone thereof, start-and-stop mechanism for the motor, means adapted to automatically move the start-and-stop mechanism to stopping position upon the stopping of the traveling element, and manually operable means adapted to actuate the start-and-stop mechanism independently of the automatic means.

56. In combination, a traveling element, a rotating element, a motor for actuating the rotating element, including a governor having a movable speed-regulating part, a member co-operatively related to this part, and adapted to determine the running zone thereof, start-and-stop mechanism for the motor, means adapted to automatically move the start-and-stop mechanism to stopping position upon the stopping of the traveling element, manually operable means adapted to actuate the start-and-stop mechanism independently of the automatic means, and eliminator means adapted to render the automatic means inoperative at will.

57. In combination, a traveling element, a rotating element, a motor for actuating the rotating element, including a governor having a movable speed-regulating part, a brake shoe adapted to engage this part to stop the motor, and to be released therefrom to permit starting, a manually operable lever adapted to actuate the brake shoe to starting and stopping position, and including a yieldable contact member adapted to engage the brake shoe member with yielding pressure, and automatic means adapted to move the brake shoe to stopping position upon stopping of the traveling element.

58. In combination, a traveling element, a rotating element, a motor for actuating the rotating element, including a governor having a movable speed-regulating part, a brake shoe adapted to engage this part to stop the motors, and to be released therefrom to permit starting, a manually operable lever adapted to actuate the brake shoe to starting and stopping position, and including a spring-controlled contact pawl adapted to engage the brake shoe member with yielding pressure, and automatic means adapted to move the brake shoe to stopping position upon the stopping of the traveling element.

59. In combination, a motor-plate, a motor-frame secured thereto, and providing a space therebetween, a motor carried by the motor-frame, a rotatable element driven by the motor, a traveling element co-operating with the rotating element and carried by the motor-plate, a start-and-stop mechanism mounted upon the motor-plate in the space between the motor-plate and the motor-frame, and adapted to co-operate with the motor to start and stop it, and including automatic means adapted to stop the motor upon the stopping of the traveling element.

60. In combination, a motor-plate formed of sheet metal, a motor-frame formed of cast metal, secured to the motor-plate and insulated therefrom, and providing a space between the motor-plate and the motor-frame, a motor carried by the motor-frame, a rotatable element driven by the motor, a traveling element co-operating with the rotatable element and carried by the motor-plate, a start-and-stop mechanism assembled upon the motor-plate as a unit and disposed between the motor-plate and the motor-frame, and adapted to co-operate with the motor to start and stop it, and including automatic means adapted to stop the motor upon the stopping of the traveling element.

61. In combination, a motor-plate formed of sheet metal and having a plurality of reinforcing ribs pressed therein in intersecting relation to each other, a motor-frame formed of cast metal, secured to the motor-plate and insulated therefrom, and providing a space between the motor-plate and the motor-frame, a rotatable element driven by the motor, a traveling element co-operating with the rotatable element and carried by the motor-plate, a start-and-stop mechanism assembled upon the motor-plate as a unit and disposed between the motor-plate and the motor-frame, and adapted to co-operate with the motor to start and stop it, and including automatic means adapted to stop the motor upon the stopping of the traveling element.

62. In combination, a motor-plate formed of sheet metal and having a plurality of reinforcing ribs pressed therein in intersecting and parallel relation to each other, a motor-frame formed of cast metal, secured to the motor-plate and insulated therefrom, and providing a space between the motor-plate and the motor-frame, a rotatable element driven by the motor, a traveling element co-operating with the rotatable element and carried by the motor-plate, a start-and-stop mechanism assembled upon the motor-plate as a unit and disposed between the motor-plate and the motor-frame, and adapted to co-operate with the motor to start and stop it, and including automatic means adapted to stop the motor upon the stopping of the traveling element.

63. In combination, a phonograph motor-plate formed of sheet metal, and automatic-stop mechanism assembled as a unit thereon.

64. In combination, a phonograph motor-plate, and automatic-stop mechanism assembled as a unit thereon.

65. In combination, a phonograph motor-plate, automatic-stop mechanism assembled as a unit thereon, and a motor supported by the motor-plate, and adapted to co-operate with the automatic-stop mechanism thereon.

66. In combination, a traveling element, a rotating element, a freely movable brake member, and means co-operating with the brake member, and acting when the traveling element stops, to move the brake member into braking position.

67. In combination, a traveling element, a rotating element, a motor-board, a motor for the rotating element supported beneath the motor-board, a brake for the rotating element, and means located beneath the motor-board and rendered operative by the stopping of the traveling element to apply the brake.

68. In combination, a traveling element, a rotating element, a brake member for the rotating element, a lever for moving the brake to braking position and adapted to be actuated to release the brake, means for rendering the lever inoperative while the traveling element moves, mechanism for operating said means from the rotating element and for moving the lever into position to actuate the brake when the traveling element ceases to move.

69. In combination with a traveling element and a rotating element, a braking member adapted both to regulate the speed of the rotating element and to automatically stop it on the stopping of the traveling element.

70. In combination with a traveling element and a rotating element, a member adapted both to regulate the speed of the rotating element and to automatically stop it on the stopping of the traveling element.

71. In combination with a traveling element, a rotating element and a rotating element governor, of means acting on the governor for stopping the rotating element on the stopping of the traveling element.

72. In combination with a traveling element and a rotating element, of means for comanually starting and stopping the rotating element, and stopping means including a cam actuated by the rotating element.

73. In combination with a traveling element, and a rotating element, manually operated stop-means for the rotating element, means for automatically starting the rotating element through movement of the traveling element, and other means for automatically stopping the rotating element through the stopping of the traveling element.

74. In combination with a traveling element and a rotating element, means for automatically starting the rotating element through movement of the traveling element, and other means for automatically stopping the rotating element through the stopping of the traveling element.

75. In combination with a traveling element and a rotating element, means for manually stopping and starting the rotating element, and other means for automatically stopping it through the stopping of the traveling element.

76. In combination, a traveling element, a rotating element, stop mechanism, a pivoted lever adapted to actuate the stop mechanism to stopping or non-stopping position, a relatively long projection on the pivoted lever, a cam lever engaging the projection of the pivoted lever to retain it yieldably in either of its moved positions, the engagement of the cam lever with the projection being such as to be maintained upon a limited movement of the pivoted lever transversely of the cam lever.

77. In combination, a motor-plate having an opening therein, a traveling element, a rotating element, stop mechanism, a pivoted lever adapted to acuate the stop mechanism to stopping or non-stopping position, a relatively long projection on the pivoted lever engaging the opening of the motor-plate and adapted to have movement therein, a member engaging the projection between the pivoted lever and the motor-plate and cooperating with the pivoted lever, the engagement being such as to be maintained upon a limited movement of the pivoted lever transvrsely of the member.

78. In combination, a motor-plate having an opening therein, a traveling element, a rotating element, stop mechanism, a pivoted lever having movement in a plane substantially parallel to the motor-plate and adapted to acutate the stop mechanism to stopping or non-stopping position, a relatively long projection on the pivoted lever engaging the opening of the motor-plate and adapted to have movement therein, a member having movement in a plane substantially parallel to the plane of movement of the pivoted member engaging the projection between the pivoted lever and the motor-plate and cooperating with the pivoted lever, the engagement being such as to be maintained upon a limited movement of the pivoted member transversely of its plane of rotation.

79. In combination, a motor-plate having an enlongated opening, a traveling element, a rotating element, automatic stop mechanism mounted upon the motor-plate, and including a relatively long lever, a pin provided thereon and engaging the opening of the plate, and means engaging the pin between the lever and the motor-plate, the engagement of the pin in the opening of the motor-plate adapted to maintain its engagement with the means upon a limited movement of the lever away from the plate.

80. In a phonograph, the combination of a traveling element, a rotating element, a motor for actuating the rotating element, including a governor having a movable speed-regulating part, a brake shoe member adapted to engage this part to stop the motor, and to be released therefrom to permit starting, means adapted to automatically apply the brake shoe member upon the stopping of the traveling element, a regulating member adapted to determine the playing position of the brake shoe, and means for adjusting the regulating member to change its regulating effect.

81. In a phonograph, the combination of a traveling element, a rotating element, a motor for actuating the rotating element including a governor having a movable speed-regulating part, a brake shoe member adapted to engage this part to stop the motor, and to be released therefrom to permit starting, means adapted to automatically apply the brake shoe member upon the stopping of the traveling element, a pivoted regulating member adapted to determine the playing position of the brake shoe, and means for changing its pivotal axis to adjust its regulating effect.

82. In a phonograph, the combination of a traveling element, a rotating element, a motor for actuating the rotating element, including a governor having a movable speed-regulating part, a brake shoe member adapted to engage this part to stop the motor, and to be released therefrom to permit starting, means adapted to automatically apply the brake shoe member upon the stopping of the traveling element, a pivoted regulating member having an extended brake shoe engaging portion adapted to determine the playing position of the brake shoe, and a rotatable adjustable eccentric pivot bearing for the regulating member adapted to be adjusted to change the regulating effect of the regulating member.

83. In a phonograph, the combination of a traveling element, a rotating element, a motor for actuating the rotating element, including a governor having a movable speed-regulating part, a brake shoe member adapted to engage this part to stop the motor, and to be released therefrom to permit starting, means adapted to automatically apply the brake shoe member upon the stopping of the traveling element, a regulating member adapted to determine the playing position of the brake shoe and having an index pointer, a scale for the index pointer, and means for adjusting the regulating member, to synchronize its regulating member to synchronize its regulating effect with the scale and index relation.

84. In an automatic start-and-stop mechanism for motors, manual means adapted to stop the motor and to permit starting, automatic means adapted to stop the motor, automatic means adapted to permit starting, the automatic starting means being operative after the motor has been stopped automatically and when the manual stopping means is in position to permit starting.

85. In an automatic start-and-stop mechanism for motors, automatic means adapted to stop the motor, automatic means adapted to permit starting, means for rendering the automaic stopping means inoperative at will, and manual means adapted to stop the motor and to permit starting, said manual stopping means being adapted to be applied to stop the motor when the automatic stopping means is inoperative.

86. In an automatic start-and-stop mechanism for motors, automatic means adapted to stop the motor, means for rendering the automatic stopping means inoperative, and manual stop means adapted to stop the motor, said manual stop means being adapted to be applied when the automatic stopping means is inoperative.

87. In an automatic start-and-stop mechanism for motors, automatic means adapted to stop the motor, means for rendering the automatic stopping means inoperative, and manual stop means adapted to stop the motor and to permit starting, said manual stop means being adapted both to be applied at will, and also when the automatic stopping means is inoperative.

88. In combination with a traveling element and a rotating element, means for manually stopping and starting the rotating element, and other means for independently and automatically starting and stopping it through the stopping of the traveling element.

89. In combination with a traveling element and a rotating element, means for manually stopping and starting the rotating element, and other means for independently and automatically starting and stopping it through the movement and stopping of the traveling element, respectively.

Signed at Bridgeport, in the county of Fairfield and State of Connecticut, this 31st day of March A. D. 1921.

THEODORE C. ROBERTS.